(12) United States Patent
Paris

(10) Patent No.: US 6,571,040 B2
(45) Date of Patent: May 27, 2003

(54) MULTIPLE PLANAR COMPLEX OPTICAL DEVICES AND THE PROCESS OF MANUFACTURING THE SAME

(75) Inventor: Bertrand Paris, Avon (FR)

(73) Assignee: Corning Incorporated, Corning, NY (US)

(*) Notice: Subject to any disclaimer, the term of this patent is extended or adjusted under 35 U.S.C. 154(b) by 47 days.

(21) Appl. No.: 09/829,083

(22) Filed: Apr. 9, 2001

(65) Prior Publication Data

US 2002/0003930 A1 Jan. 10, 2002

(30) Foreign Application Priority Data

Jul. 6, 2000 (EP) .............................................. 00401937

(51) Int. Cl.⁷ ................................................. G02B 6/26
(52) U.S. Cl. .......................... 385/50; 385/129; 385/147
(58) Field of Search ......................... 385/50, 129, 147, 385/14, 49, 52

(56) References Cited

U.S. PATENT DOCUMENTS 5,197,109 A * 3/1993 Ichigi et al. .................. 385/50
5,481,632 A * 1/1996 Hirai et al. ................... 385/49
5,703,973 A * 12/1997 Mettler et al. ................ 385/14
5,715,341 A * 2/1998 Osugi et al. .................. 385/50
5,828,800 A * 10/1998 Henry et al. .................. 385/20
5,974,214 A    10/1999 Shacklette et al. ............ 385/50
6,052,500 A    4/2000  Takano et al. ................ 385/50

FOREIGN PATENT DOCUMENTS

| EP | 0 798 579 A1 | 10/1997 |
| WO | WO 95/27225 | 10/1995 |
| WO | WO 98/45736 | 10/1998 |

* cited by examiner

Primary Examiner—Phan T. H. Palmer
Assistant Examiner—Jennifer Doan
(74) Attorney, Agent, or Firm—Price, Heneveld, Cooper, DeWitt & Litton

(57) ABSTRACT

A method of coupling at least two planar optical devices that includes the steps of aligning a first optical device having a substrate and at least one waveguide to a second optical device having a substrate and at least one waveguide such that the optical devices have aligned waveguides, and abutting the aligned waveguides of the first and second optical devices. The method further includes coupling the respective substrates of the optical devices together, and fusing the optical waveguide of the first optical device to the optical waveguide of the second optical device.

24 Claims, 2 Drawing Sheets

MULTIPLE PLANAR COMPLEX OPTICAL DEVICES AND THE PROCESS OF MANUFACTURING THE SAME

CROSS-REFERENCE TO RELATED APPLICATIONS

This application is based upon European Application Serial Number 00401937.8, filed on Jul. 6, 2001, from which the benefit of priority is hereby claimed, and the full content which is incorporated herein by reference as though fully set forth.

BACKGROUND OF THE INVENTION

1. Field of the Invention

The present invention relates to a method of manufacturing multiple complex planar optical devices and the resultant devices.

2. Technical Background

Optical networks used in the communications industry require many complex optical components, examples of which include N×M switches, gain-flattening filters, variable attenuators, add-drop multiplexers, splitters, and other components. An efficient manner in which to design and manufacture such components is to use planar optical devices, or chips, inasmuch as many optical functions can be implemented on the same substrate. Presently, integrating a large number of optical functions into a planar optical device is limited by the relatively small size of a silica substrate due to fabrication techniques such as chemical vapor deposition (CVD).

In order to provide more complex optical devices, individual chips containing a number of optical functions have been mechanically joined to one another. One approach for connecting chips utiles a suitable mounting platform and optical fibers for coupling waveguides of individual chips to corresponding waveguides of an adjacent chip. The optical path adhesive employed to couple the optical fibers to the waveguides must exhibit a high degree of light transmittance to reduce propagation losses at the bond joints and must have a refractive index which closely matches that of the optical components being joined. In the past, optical adhesives, such as NOA61, available from Norland Products, Inc, New Brunswick, N.J. have been employed for coupling multiple optical function chips using optical fibers. There exists a need for joining different optical functioning devices to form complex networks in which the optical fiber interconnection between the chips and the mounting of chips to substrates, involving multiple complex steps, both of which result in relatively costly optical systems, are eliminated.

SUMMARY OF THE INVENTION

The method and resultant structure of the present invention provides for the coupling of a plurality of individual planar optical components to one another by aligning and mechanically coupling the substrates of planar chips carrying optical waveguides thereon to one another and subsequently coupling the aligned optical waveguides, such as by heat fusion. Depending upon the substrate material, the substrates can, once precisely aligned to one another to align mating waveguides utilizing an active alignment process, be coupled by bonding utilizing either heat fusion in the case of a silica substrate; or by a bonding adhesive in the case of a silicon substrate. Once the aligned substrates have been mechanically coupled to one another, the optical waveguides are coupled utilizing, for example, heat fusion and preferably a focused $CO_2$ laser which completes the mechanical and optical interconnection of multiple devices. It is possible with such alignment and coupling by bonding and/or fusion to couple numerous chips in an array which can subsequently be packaged for use in relatively complex optical networks. The resultant devices display a high level of reliability, are relatively inexpensive to manufacture, and display excellent operating characteristics.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
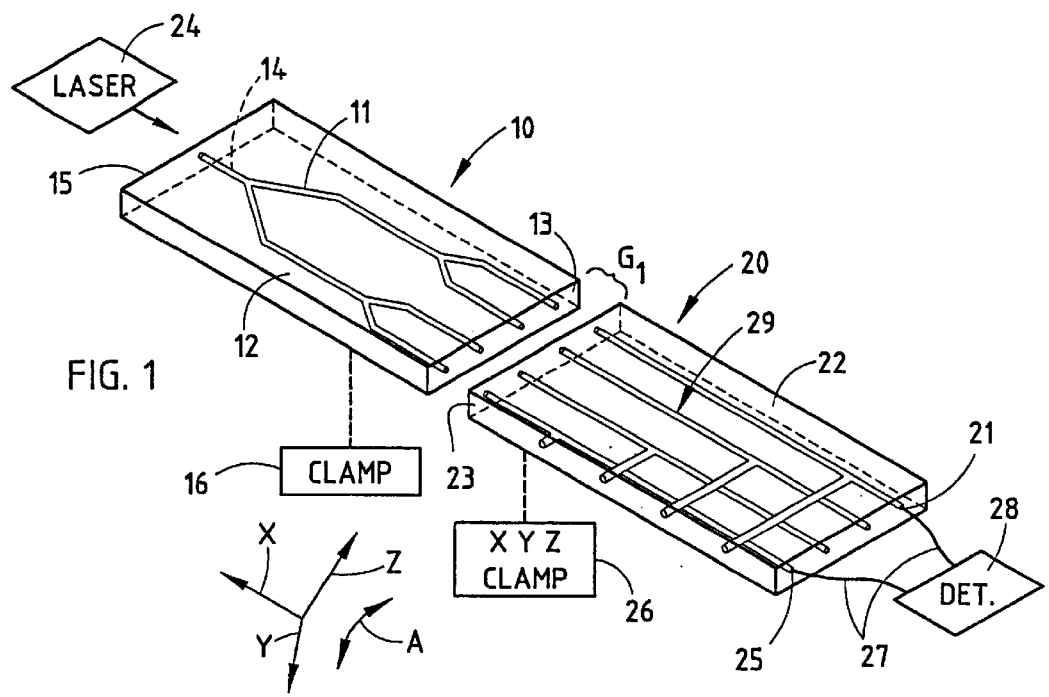
FIG. 1 is a perspective schematic view showing the alignment process for a pair of planar optical devices.

Referring initially to FIG. 1, there is shown a first planar optical device or component 10, such as a splitter, which is to be coupled to a second planar optical device 20, such as a switch. Each of the planar optical devices 10 and 20 can be manufactured as chips utilizing conventional manufacturing techniques, such as CVD or the like. The devices 10 and 20 are typically manufactured on a silica ($SiO_2$) substrate (12 and 22 respectively), although as described below, they can also be manufactured on a silicon (Si) substrate, which alters the manufacturing process as described in detail below.

The devices 10 and 20 illustrated in FIG. 1 are shown inverted with the substrates 12, 22 on the top. Each of the substrates are silica having a thickness of approximately 500$\mu$. The devices typically includes a 10$\mu$ buffer or undercladding layer adjacent the substrate, a core patterned to include optical waveguides (shown as patterns 11, 29 in FIG. 1) of silica with a dopant such as boron, germanium, or the like to provide an index of refraction at 1550 nm of about 1.44 to about 1.55. An overcladding layer of silica having a different but conventional dopant mixture providing an index of refraction of approximately 1% greater than that of the undercladding and of, for example, from about 1.5 to about 1.6 covers the waveguides 11, 29 and also has a thickness of approximately 10$\mu$. The substrate and layers of undercladding, overcladding, and the waveguides are patterned utilizing conventional photolithographic and masking processes employed for manufacturing planar optical components, such as optical devices 10 and 20 in FIG. 1. Typically multiple devices are fabricated on a single wafer during mass production, which wafers are subsequently diced into the individual chips containing devices, such as devices 10 and 20. The edges of the chips with the exposed waveguides have surfaces which typically are flat within $1\mu$ from edge to edge.

In order to couple the optical devices 10 and 20 employing the method of the present invention, one of the chips, such as device 10, is mounted in a fixed clamp shown in block form in FIG. 1 as element 16, while the other device, such as switch 20, is mounted in an XYZ micro-adjustment stage shown as element 26 in FIG. 1. The fixed clamp and adjustable stage can be conventional devices widely used in the manufacture of optical devices and are suitably mounted to a work station. The clamp and stage hold the end 13 of device 10 in a direction facing end 23 of device 20 for alignment prior to the mechanical and optical coupling of the two devices 10 and 20. An active alignment system is employed to assure precise alignment of mating waveguides. For such purpose, an input signal at 1550 nm is injected from a signal source 24, such as a laser, to an input waveguide 14 of splitter 10 which divides the input signal to four outputs, as seen schematically in FIG. 1, for splitter 10. Switch 20 has four pass-through waveguides and four transversely extending waveguides, as shown schematically in the figure, for selectively coupling signals on any of the inputs to a selected output. For the purpose of actively aligning the components 10 and 20, a detector 28 is coupled to the outermost waveguides 21, 25 of switch 20 by optical fibers 27 such that the signals on each of the waveguides 21, 25 can be detected by detector 28. The devices 10 and 20 are aligned for maximum signal transmission in a switching state which allows the pass through of signals to detector 28.

Initially, the devices are aligned with a gap $G_1$ (FIG. 1) of approximately $5\mu$ to allow movement of device 20 with respect to device 10 while monitoring signals by detector 28 until the maximum signal transmission is detected. Device 20 can be moved in the X, Y, and Z planes, as shown in the diagram of FIG. 1, individually or collectively to provide translation and/or rotation such as in a direction indicated by arrow A of FIG. 1 of device 20 with respect to fixed device 10 until the desired alignment is achieved. Once the maximum signal transmission has been detected, clamp 26 moves device 20 in a direction along its longitudinal axis (X shown in FIG. 1) for joining the two devices 10 and 20, such that the ends 13 and 23 are in abutment.

Figure 2:
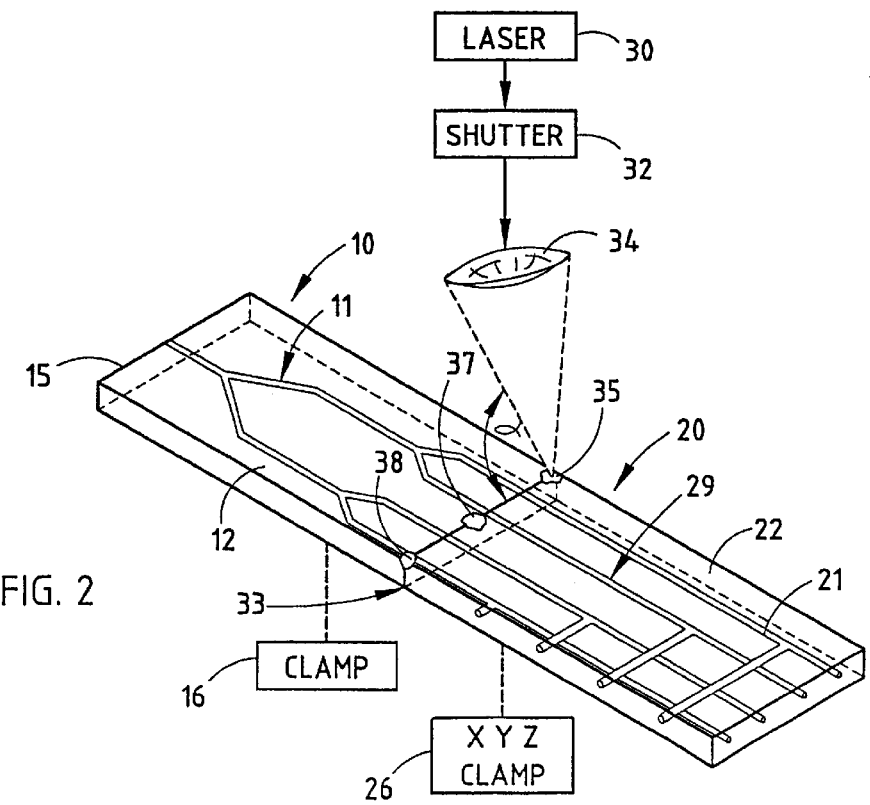
FIG. 2 is a perspective schematic view of a first step in the process of coupling the planar optical devices shown in FIG. 1.

Next, the permanent mechanical coupling of the devices is accomplished. In the preferred embodiment, the substrates 12 and 22 of devices 10 and 20 are fused in areas adjacent to but not contacting any of the waveguides 11 and 21. In a preferred embodiment of the invention, the mechanical joint for a silica substrate is made by fusion with a $CO_2$ laser 30, such as a Synrad 25 watt laser operating at 10 to 15 watts. The beam is controlled by a shutter 32 to provide pulses of radiation directed to a converging lens 34 having a focal length of about 127 mm and spaced from substrates 12 and 22 a distance to focus the elliptical laser beam to a spot 35 of approximately $100\mu$ diameter onto the junction 33 of the substrates. As seen in FIG. 2, the mechanical junction is provided by focusing the laser beam onto the substrate layer of the devices 10 and 20 at positions 35 on one edge, 38 on an opposite edge, and 37 in the center between adjacent waveguides. The shutter 32 is a commercially available model which is controlled to pulse the laser on-time for two to three seconds for several pulses to provide fusion of the silica substrates to a depth of $100\mu$ to $200\mu$. The laser beam is directed at an acute angle $\alpha$ of, in the preferred embodiment, of about 45° to an axis normal to the plane of the devices 10, 20. In any embodiment angle $\alpha$ is an acute angle. Although three areas of fusion are shown for chips of about 5 mm by 35 m additional areas of fusion could be employed if necessary with larger chip sizes.

The now optically aligned and mechanically coupled optical devices 10 and 20 are removed from clamps 16 and 26 and flipped over and reclamped (FIG. 3) to present the optical waveguides to the same laser beam. The laser beam is similarly controlled and aligned with respect to the combined devices 10, 20 (typically by the utilization of a microscope and a visible guiding laser beam) onto the abutting, aligned waveguides of devices 10 and 20. The pitch between adjacent waveguides is approximately $350\mu$, such that the spot width of $100\mu$ when aligned with each waveguide, fuses the adjacent waveguides from component 10 to component 20 while maintaining isolation between adjacent waveguides. Fusion of the aligned respective waveguides at locations 40, 42, 44, and 46 (FIG. 3) in the example illustrated is achieved using the same laser 30 and application of power therefrom through shutter 32 and lens 34 as described above with respect to FIG. 2. Since one waveguide core is fused to the other waveguide core by the heat generated by the focused laser beam, there is substantially no back reflection at the joint which might otherwise result from a mismatch of index of refraction between the waveguides. Further, by providing the fusion process shown in FIG. 3, different size waveguides can be coupled to one another with the fusion zones coupling the waveguides and blending any slight differences that may exist in the indices of refraction.

Figure 3:
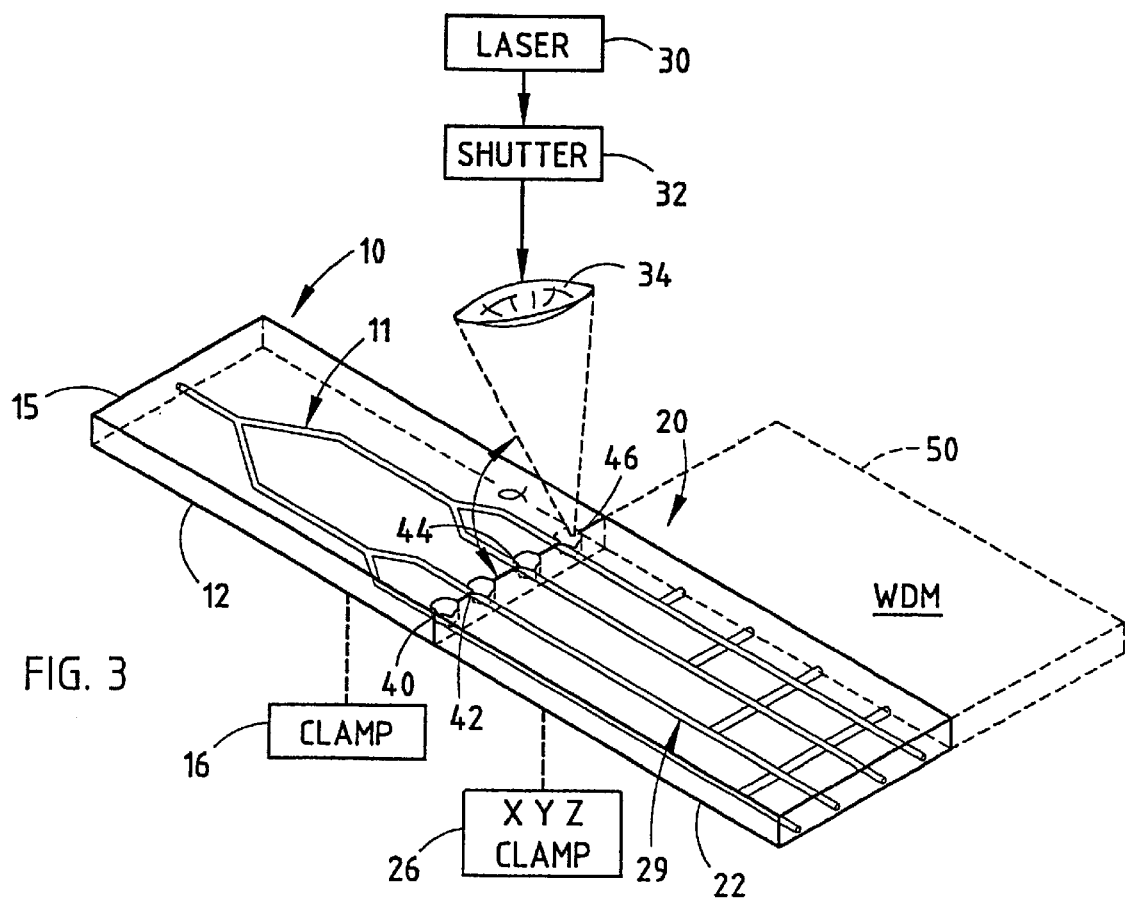
FIG. 3 is a perspective schematic view of a second step in the coupling of the planar optical devices shown in FIGS. 1 and 2.

By coupling adjacent planar optical devices as described with references to FIGS. 1–3, the resulting complex optical component need not be hermetically sealed but only conventionally packaged for receiving input and output optical fibers. Although the example given is shown for joining two components, such as a splitter 10 and switch 20, respectively, additional components, such as a wave division multiplexer 50 (shown in phantom lines in FIG. 3) can similarly be aligned and joined to switch 20 utilizing the processing steps shown in FIGS. 1–3 and the resultant component can be tested by the operation of switch 20 and the application of different frequency input signals to test the overall operation of the resultant multiple component device. Thus, the joining of components utilizing the processes illustrated in FIGS. 1–3 can be repeated for additional components to form an XY array of multiple components, limited only by the mechanical structure of the substrate thickness employed. Further, if desired, more than two components can be aligned and mechanically and optically coupled at the same time, although it is preferred to join two together and subsequently test the combination before additional components are optically coupled to make certain that, as multiple chip components are constructed, at each stage the resultant component passes quality control standards.

In the event a silicon substrate is employed as opposed to a silica substrate, in place of the step illustrated in FIG. 2, a bonding adhesive, such as MCA-95 available from Corning Incorporated, is applied to the junction of substrates 12 and 22 of devices 10 and 20 utilizing a syringe to provide coupling of the substrates by adhesive bonding of the substrates. Subsequently, the optical waveguides are coupled by fusion utilizing the same process as described in connection with FIG. 3.

As yet another alternative, the alignment and coupling of substrate processes illustrated in FIGS. 1 and 2 can be employed to mechanically join aligned complex optical components. The optical waveguides then can be coupled utilizing an optical bonding adhesive in place of fusion. An optical adhesive which may be used is, for example, UV3000 available from Nippon Telephone and Telegraph which has an index of refraction of approximately 1.49 once polymerized. The optical adhesive is applied to the facing ends of the waveguides utilizing a syringe.

Thus, the system of the present invention provides both the mechanical and optical coupling of planar optical devices and accommodates different material substrates to form a complex optical device. It will become apparent to those skilled in the art that various modifications to the preferred embodiment of the invention as described herein can be made without departing from the spirit or scope of the invention as defined by the appended claims.

What is claimed is:

1. A method of coupling at least two planar optical devices comprising the steps of:

aligning a first optical device having a substrate and at least one waveguide to a second optical device having a substrate and at least one waveguide such that the optical devices have aligned waveguides;

abutting the aligned waveguides of the first and second optical devices;

coupling the respective substrates of the optical devices together; and fusing the optical waveguide of the first optical device to the optical waveguide of the second optical device.

2. The method of claim 1, wherein the first and second optical devices include at least one input waveguide and at least one output waveguide and wherein the alignment step comprises injecting an input signal to the input waveguide of the first optical device and monitoring the output signal from the output waveguide of the second optical device while changing the relative position of the first and second optical devices thereby aligning the at least one output waveguide of the first optical device with the at least one input waveguide of the second optical device.

3. The method of claim 2, wherein the step of coupling the substrates of the first and second optical devices comprises fusing the substrate of the first optical device to the substrate of the second optical device.

4. The method of claim 3, wherein the step of fusing the optical waveguide comprises the step of focusing a laser beam onto the junction of the waveguides of the first and second optical devices.

5. The method of claim 4, wherein the fusing of the substrates of the first and second optical components comprises focusing a laser beam onto the substrates of the optical components at spaced-apart locations.

6. The method of claim 5, wherein the spaced-apart locations on the substrates comprise at least three spaced-apart locations including two opposite edges of the optical devices.

7. The method of claim 1, wherein said alignment step comprises the steps of clamping one of the optical devices in a stationary position and holding the other of the optical devices in a movable stage allowing adjustment of the relative positions of the optical devices.

8. The method of claim 1, wherein the substrates of the optical devices are made of silicon and the step of coupling the respective substrates includes applying a bonding adhesive to the junction of the optical devices.

9. The method of claim 1, wherein the substrates of the optical devices are silica and the bonding of the respective substrates comprises heat fusing the junction of the substrates at spaced-apart locations.

10. The method of claim 9, wherein the step of heat fusing the junction of the substrates comprises focusing a laser beam onto the substrates.

11. An optical device made of at least two optical devices comprising:

a first optical device having a substrate and at least one waveguide;

a second optical device having a substrate and at least one waveguide;

wherein the respective substrates of the optical devices are coupled together with the waveguides in optical alignment with one another; and wherein the optical waveguide of the first optical device is fused to the optical waveguide of the second optical device.

12. The optical device of claim 11, wherein the respective substrates of the first and second optical devices are made of silica and the substrates are thermally fused together.

13. The optical device of claim 11, wherein the respective substrates of the first and second optical devices are made of silicon and the substrates are bonded together by a conventional adhesive bonding agent.

14. The optical device of claim 11, wherein each of said first and second optical devices are die-cut optical chips.

15. The optical device of claim 11, wherein the step of fusing the optical waveguide comprises the step of focusing a laser beam onto the junction of the waveguide of the first and second optical devices.

16. An apparatus for joining two planar optical devices comprising:

a clamp for holding the first planar optical device in a substantially stationary position;

an XYZ micro-stage for holding the second planar optical device in adjacent relationship to the first planar optical device and for aligning the first and second optical devices by moving the second planar optical device with respect to the first planar optical device to define aligned optical pathways between the planar optical devices;

a $CO_2$ laser positioned in spaced relationship to the clamp and movable stage; and a converging lens for focusing a beam of light from the laser at an acute angle to the junction of the first and second planar optical devices for fusing the substrates and the aligned optical pathways of the first and second optical devices.

17. The apparatus of claim 16, further including:

a shutter interposed in the pathway of the laser beam to control the application of the laser beam onto the optical devices.

18. A method of coupling at least two planar optical devices comprising the steps of:

aligning a first planar optical device having a substrate and at least one waveguide to a second planar optical device having a substrate and at least one waveguide to form aligned waveguides;

abutting the aligned waveguides of the first and second planar optical devices;

coupling the respective substrates of the optical devices together; and coupling the optical waveguide of the first device to the optical waveguide of the second device using an optical index matching adhesive.

19. The method of claim 18, wherein the substrates of the optical devices are made of silicon and the coupling step includes applying a bonding adhesive to the junction of the optical devices.

20. The method of claim 18, wherein the substrates of the optical devices are silica and the bonding of the substrates comprises heat fusing the junction of the substrates at spaced-apart locations.

21. The method of claim 20, wherein the step of heat fusing the junction of the substrates comprises focusing a laser beam onto the substrates.

22. The method of claim 18, wherein the first and second planar optical devices include at least one input waveguide and at least one output waveguide and wherein the alignment step comprises injecting an input signal to the input waveguide of the first planar optical device and monitoring the output signal from the output waveguide of the second planar optical device while changing the relative position of the first and second optical devices to align adjacent surfaces of the first and second optical devices to maximize the detected signal to assure optical alignment of the first and second planar optical devices.

23. The method of claim 22, wherein the step of coupling the substrates of the first and second planar optical devices comprises fusing the substrate of the first optical device to the substrate of the second optical device.

24. The method of claim 23, wherein the fusing of the substrates of the first and second planar optical devices comprises focusing a laser beam onto the substrates of the optical devices at spaced-apart locations.

* * * * *